Sept. 20, 1927.     W. JEVONS     1,643,245
POULTRY FOUNTAIN
Filed Jan. 24, 1927
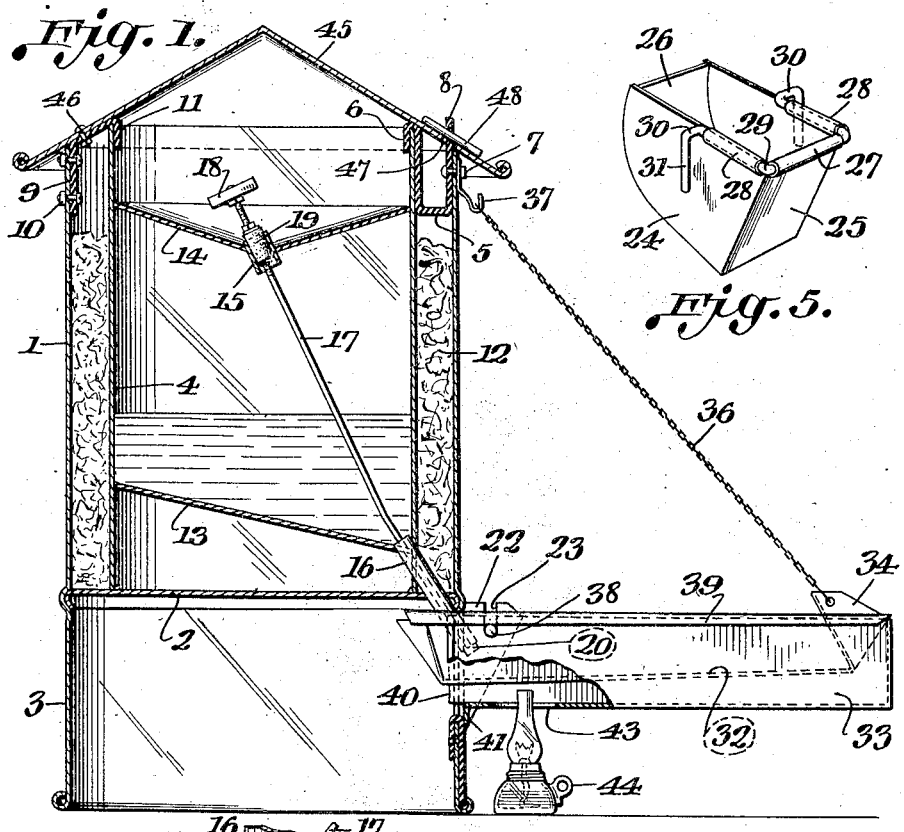
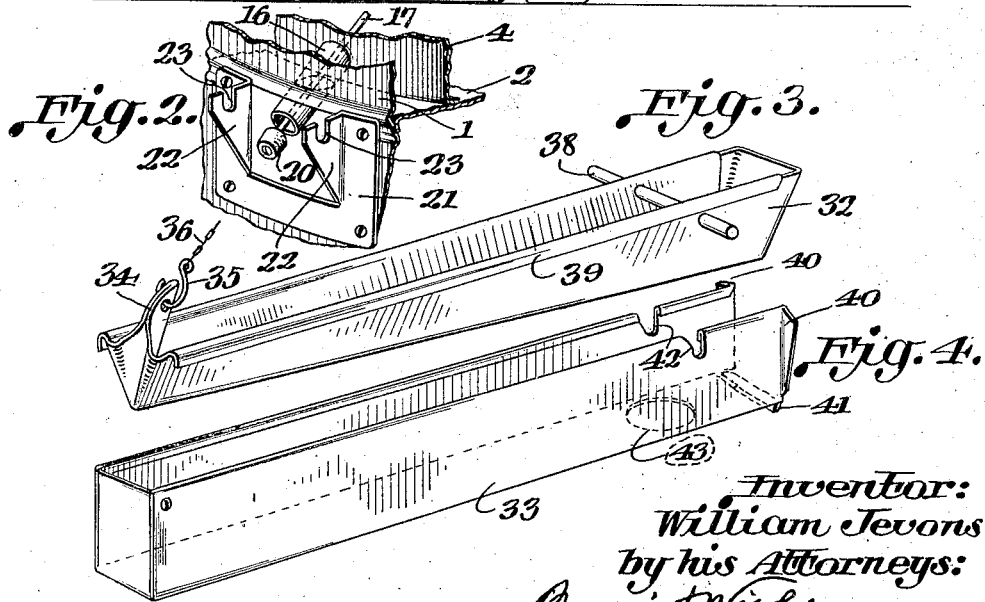
Inventor:
William Jevons
by his Attorneys:

Patented Sept. 20, 1927.

1,643,245

UNITED STATES PATENT OFFICE.

WILLIAM JEVONS, OF WAKEFIELD, KANSAS.

POULTRY FOUNTAIN.

Application filed January 24, 1927. Serial No. 163,191.

This invention relates to improvements in a poultry fountain of the type shown in patent to Ryon, 1,557,502, granted October 13, 1925 for the purpose of improving the construction and operation of the poultry fountain shown therein and adapting it for use with other animals when desired. Provision is made for readily heating the water in the trough in order to prevent its freezing in cold weather. Other objects of the invention will be apparent from the following detailed description and set forth in the appended claims.

In the drawings:

Figure 1 is a vertical section with parts in elevation through a fountain constituting the subject of the present invention.

Figure 2 is a detail perspective view on an enlarged scale of a portion of the device.

Figure 3 is a perspective view of a watering trough to be connected to the fountain.

Figure 4 is a perspective view of an auxiliary trough member to be used with a heating device.

Figure 5 is a perspective view of a drinking cup which may be used instead of the trough.

The fountain comprises an outer cylindrical shell 1, having a base 2 positioned therein considerably above the lower end of the shell. This provides a skirt 3 which rests upon the ground so that the space between the bottom 2 of the tank and the ground permits the placing of the trough at a proper level above the ground without the necessity of providing any additional support. An inner cylindrical drum 4 of less diameter rests upon the base 2 previously mentioned. A strap member 5 of general U-shape has one leg provided with a bent over end 6 so that the strap and end 6 engage both sides of the wall of the inner drum while the outer leg of the member 5 is held to the outer drum by a bolt 7 and the end of this leg projects upwardly above the top of the outer drum as shown at 8, for a purpose hereinafter set forth. On the other side a strap member 9 is provided which is affixed to the outer drum by bolts 10 or similar fastening, while the inner end is bent down at 11 and engages on the inside of the inner drum 4. In this manner the two drums are held in proper spaced relationship. When the fountain is in use, particularly in cold weather, the space between the two drums should be filled with some suitable heat insulating material as shown at 12.

The inner drum which contains the water is provided with a sloped bottom 13 which directs the same toward an outlet and prevents an accumulation of sediment. The inner drum has a cover 14 in the form of an inverted cone and a short pipe 15 is fitted therein at the apex of the cone. A pipe 16 leads from the inner drum through the base 2 and outer drum 1 into position to discharge the water into a suitable receptacle as hereinafter described. A valve stem 17 provided with a handle 18 carries a plug 19 which fits in the pipe 15 and a plug 20 which fits in the outer end of the pipe 16. These plugs are so arranged that when the pipe 16 is open the pipe 15 is closed and water will pass from the drum into the receptacle. When the valve stem is moved so that the plug 20 closes the pipe 16, the plug 19 will then open the short pipe 15 and allow the inner drum to be filled with water by pouring the same into the inverted cone top 14.

The inner wall of the drum is provided with an opening below the base 2 of a generally rectangular shape and a metal plate 21 is attached to the wall of the drum and borders this opening on three sides. This plate has inner edges bent out to form flanges 22 and the upper edge of each flange is provided with a notch 23. The lower end of the pipe 16 passes through this opening. A small cup or receptacle 24 shown in Figure 5, may be supported in position to receive water issuing from the pipe 16. The outer end wall 25 of this cup is inclined while the inner end wall 26 is curved in form. At the outer end the top edge is rolled as shown at 27 and the adjacent side edges are rolled for a short distance as indicated at 28. A wire 29 bent to proper form is positioned within these rolled edges and at each free end has a short outward turn 30 and a long downward extension 31. When it is desired to use this cup the inner end is passed through the opening in the base of the outer drum and the ends of the wire are positioned so that the portions 30 thereof fit in the notches 23 of the plate 21. When the cup is filled, the outer end of the pipe 16 will be submerged forming a liquid seal. If it is desired to empty or clean the cup, this can be done without removing the same by merely lifting on the outer end since the wire supports act as pivots and when the cup is tilted in this manner the water therein will run out of the inner end and water issuing from the pipe will clean out any sediment which may have been deposited in the cup.

Instead of this cup there may be used for the purpose of watering a larger number of animals or for small animals such as pigs, the trough member 32 shown in Figure 3 either with or without the auxiliary member 33 shown in Figure 4. This trough member 32 is of generally rectangular form and tapers toward the outer end and this outer end is provided with an upwardly extending portion forming a supporting lug 34 to which is adjusted a hook 35 on the end of a chain 36, any intermediate link of which may be attached to a hook 37 supported by the bolt 7 near the upper end of the outer drum. In this manner the trough may be held in desired position. The inner end of the trough is inserted through the opening in the base as clearly indicated in Figure 1. Both side edges are turned over as indicated at 39.

The auxiliary member 33 is used when it is desired to heat the water in the trough 32. This member is rectangular in shape and has an open inner end, each side of which is provided with an outwardly turned flange 40, while the bottom thereof has a downwardly turned flange 41. The trough 32 fits within the member 33 and the bent over edges 39 of the trough 32 fit outside the sides of the member 33. This member 33 is provided with notches 42 in which rests the pin 38 carried by the trough 32 which pin also rests in the notches 23 of the plate 31 when the parts are in operative position.

By reference to Figure 1 it will be noted that when the trough 32 and the member 33 are both employed the flanges 40 will engage the inside of the base of the drum 1 while the flange 41 rests against the outside thereof. This engagement, together with interlocking afforded by the pin 38 fitting in the notches 42 of the member 33 and the notches 23 of the plate 21 holds the parts in operative position.

The member 43 is provided near its inner end with a circular opening through which may pass the chimney of a lamp 44 or similar heating device. It is obvious that since the trough 32 is deeper at the inner than at the outer end the space between the two troughs will increase toward the outer end thereof and heat which passes up into engagement with the bottom of the trough 32 will naturally pass toward the outer end of the two troughs. In this manner the water may be prevented from freezing in cold weather, while in warm weather the trough 32 may be used without the auxiliary member 33.

The walls of the inner drum extend upward somewhat further than the walls of the outer drum and a conical cover 45 is loosely provided which is fastened by a pivot bolt 46 to the strap 9 as shown in Figure 1. This allows the cover to be turned about this bolt as a pivot and swung to position without the necessity of detaching the same from the fountain. The side of the cover opposite the pivot bolt is provided with a slot 47 which fits over the upwardly extending end 8 of the strap 5 and a cotter pin 48 or similar fastening device may be passed through an opening in the strap 8 outside of the cover to hold the same in closed position. In order to obtain access to the inner drum, it is only necessary to remove this pin 48, lift that side of the cover slightly and turn the same about the pivot 46. When again it is desired to close the fountain, the cover will be swung to position by a reverse movement and fastened as above described.

It will be noted that all parts of the fountain proper and various troughs can be struck up from sheet metal and may be made in a desired form cheaply and efficiently. It is also obvious that various detail changes may be made without in any way departing from the spirit of the invention which is to be regarded as limited only by the scope of the appended claims.

I claim as my invention:

1. A poultry fountain comprising inner and outer drums, the walls of the outer drum extending a considerable distance below those of the inner drum to form a support, an opening in the wall of the outer drum below the bottom of the inner, a liquid receptacle, a plate attached to the outer wall adjacent said opening and provided with notched ears, and means on said receptacle engaging in the notches to support the receptacle.

2. A poultry fountain comprising inner and outer drums, the walls of the outer drum extending a considerable distance below those of the inner drum to form a support, an opening in the wall of the outer drum below the bottom of the inner, a liquid receptacle, a plate attached to the outer wall adjacent said opening and provided with notched ears, means on said receptacle engaging in the notches to support the receptacle and additional means for supporting the outer end of the receptacle.

3. A poultry fountain comprising inner and outer drums, the walls of the inner drum rising above those of the outer, a strap member spacing said drums near the top thereof, a conical cover, and pivot means connecting the cover near one edge to said strap so that the cover may be swung to open position, but when closed engages the upper ends of the walls of both drums.

4. A poultry fountain comprising inner and outer drums, means on the outer drum for detachably supporting a liquid containing trough decreasing in depth towards its outer end, an auxiliary member substantially enclosing the trough but spaced therefrom so that the space between the trough and member increases toward the outer end, and means for supplying heat to said space near the inner end of the trough.

In testimony whereof, I have hereunto subscribed my name.

WILLIAM JEVONS.